B. SCHLOSS.
PRESERVING JAR.
APPLICATION FILED JUNE 16, 1913.

1,095,470.

Patented May 5, 1914.

WITNESSES:
F. E. Maynard.
Charles Pickles

INVENTOR
Benjamin Schloss.
BY G. H. Strong.
ATTORNEY

UNITED STATES PATENT OFFICE.

BENJAMIN SCHLOSS, OF SAN FRANCISCO, CALIFORNIA.

PRESERVING-JAR.

1,095,470.  Specification of Letters Patent.  Patented May 5, 1914.

Application filed June 16, 1913. Serial No. 773,834.

*To all whom it may concern:*

Be it known that I, BENJAMIN SCHLOSS, a citizen of the United States, residing in the city and county of San Francisco and State of California, have invented new and useful Improvements in Preserving-Jars, of which the following is a specification.

This invention relates to preserving jars, and particularly to fruit jars of the type in which a container or vessel having an upper threaded portion is closed by a two-part cap structure consisting of a cover and a clamp ring.

The object of the present invention is to provide a simple and very cheap means for effectually hermetically sealing a fruit jar after heated contents have been placed in the jar; and particularly to provide a jar of this type having a cap or cover portion so constructed and arranged that it permits ready access to the packing gasket so that the vacuum under the cover can be readily broken when it is desired to open the jar.

The invention consists of the parts and the construction and combination of parts as hereinafter more fully described and claimed, having reference to the accompanying drawings, in which—

Figure 1:
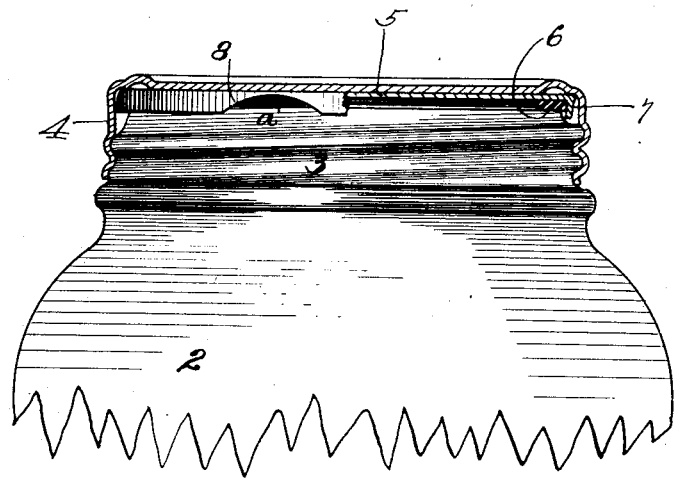
Figure 2:
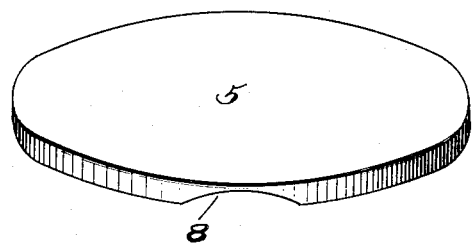

Figure 1 is a side elevation of the upper portion of a suitable fruit jar, showing the cover and clamp ring members in section. Fig. 2 is a perspective view of the disk cover.

A portion of the jar 2 is shown in the drawings, the upper end of which is provided with the usual threads 3 for the reception of an annular flange, screw, ferrule or ring 4. The threads of the ring 4 are adapted to fit the threads 3 of the fruit jar so that when the clamp ring is screwed tightly down upon the top edge of the jar, a suitable disk-like cover or top member 5 is forced securely down upon a rubber or other suitable gasket 6. The gasket 6 rests upon the upper edge of the jar 2 and occupies a position around and close to the downwardly turned flange 7 of the cover 5.

Considerable difficulty is usually encountered in opening fruit jars in which substances have been charged while in a heated condition, because of the vacuum produced during the cooling of the preserved material. The consequence is that when an attempt is made to open the jar, considerable difficulty is encountered, and frequently the parts are so mutilated or the jar entirely broken as to be rendered useless.

The important feature of the present invention is the provision of a cover, as the disk 5, having adjacent to its rim or periphery where it bears upon the gasket 6 an indent, notch or recess, as 8, here shown as being formed in the flange 7. The top of the notch is sufficiently deep in the flange 7 so as to expose the edge of the top of the jar 2 and the adjacent portion and edge of the gasket 6. Then, when it is desired to open the jar 2, the housewife or operator simply unscrews the ferrule or ring 4, thus exposing the cap 5 to view, and the jar can be turned in the hand until the notch 8 is brought to such a position that with the other hand a knife or other convenient implement may be inserted at the joint or line of seam between the lower surface of the gasket 6 and the top edge of the jar 2, as indicated at *a*, Fig. 1. By provision of this means for affording access to the gasket, it will be seen that an implement can be inserted beneath the gasket to lift the same from its seat without in any wise injuring the cover or its flange and without mutilating the gasket and without danger of breaking the jar.

Having thus described my invention, what I claim and desire to secure by Letters Patent is—

In combination with a jar and its screw cap, and a gasket seated on the upper extreme edge of the jar, a disk-like cover which seats on the upper face of the gasket and is engaged by said screw cap, and a downwardly extending flange on the cover the inner circumference of which engages the gasket periphery, said flange having a recess which extends from points adjacent to the under face of the cover completely through the lower edge of said flange whereby the part of the gasket which registers with said opening has its under face exposed through the bottom of the opening and accessible to permit a sharp instrument to be moved up from below the flange into the recess and inserted between said upper edge of the jar and the under face of the gasket, so that in raising the outer end of the instrument the part of the gasket engaged by the instrument will be compressed and moved upwardly to enter the recess.

In testimony whereof I have hereunto set my hand in the presence of two subscribing witnesses.

BENJAMIN SCHLOSS.

Witnesses:
WENDEL SCHLOSS,
H. WALLERSTEIN.